(12) United States Patent
Suda et al.

(10) Patent No.: US 7,904,993 B2
(45) Date of Patent: Mar. 15, 2011

(54) SPHERICAL BEARING FOR LOCK GATE DOOR AND LOCK GATE DOOR HAVING THE SAME

(75) Inventors: Hiroshi Suda, Novi, MI (US); Maki Hirayama, Kanagawa (JP); Vernon Harold Bryant, Virginia Beach, VA (US)

(73) Assignee: Oiles Corporation, Tokyo (JP)

( * ) Notice: Subject to any disclaimer, the term of this patent is extended or adjusted under 35 U.S.C. 154(b) by 1483 days.

(21) Appl. No.: 11/312,643

(22) Filed: Dec. 21, 2005

(65) Prior Publication Data

US 2007/0160426 A1    Jul. 12, 2007

(51) Int. Cl.
 *E05D 7/00*    (2006.01)
(52) U.S. Cl. .................................................. 16/224
(58) Field of Classification Search .......... 16/224, 16/378, 379, 273–275, 260–262; 405/85, 405/87, 99–102, 107, 110; 384/206, 209–211, 384/218; 403/122, 127, 132, 133, 135, 140; 49/398, 396
See application file for complete search history.

(56) References Cited

U.S. PATENT DOCUMENTS

| | | | |
|---|---|---|---|
| 1,169,566 A * | 1/1916 | Prieskorn | 16/224 |
| 2,010,468 A * | 8/1935 | Spencer | 49/236 |
| 2,040,721 A * | 5/1936 | Zimmermann | 405/99 |
| 2,147,816 A | 2/1939 | Hufferd et al. | |
| 2,182,601 A | 12/1939 | Venditty | |
| 2,424,431 A | 7/1947 | Booth | |
| 2,610,355 A * | 9/1952 | Becker | 16/224 |
| 3,320,699 A * | 5/1967 | Carson et al. | 49/388 |
| 4,109,821 A * | 8/1978 | Lutz | 220/836 |
| 5,249,334 A * | 10/1993 | Horberg et al. | 16/224 |
| 5,263,227 A * | 11/1993 | Hrbek et al. | 16/224 |
| 5,549,012 A | 8/1996 | Read | |

FOREIGN PATENT DOCUMENTS

| | | |
|---|---|---|
| GB | 518 857 A | 3/1940 |
| GB | 2 233 385 A | 1/1991 |
| JP | 2001-055706 | 2/2001 |
| JP | 2001-055707 | 2/2001 |
| JP | 2001-055708 | 2/2001 |
| JP | 2002-285533 | 10/2002 |

* cited by examiner

*Primary Examiner* — Chuck Y. Mah
(74) *Attorney, Agent, or Firm* — Nixon & Vanderhye P.C.

(57) ABSTRACT

A lock gate door (1) includes a pair of door bodies (2, 3); a pair of spherical bearings (6) for a lock gate door for rotatably supporting lower corner portions (4) of the door bodies (2, 3), respectively; and a pair of supporting portions (7) for rotatably supporting upper corner portions (5) of the door bodies (2, 3), respectively. The spherical bearing (6) includes a convex curved body (22) having a spherical surface (21) and a concave curved seat (24) having a toroidal curved surface (23) which slidably contacts the convex curved body (22), and is disposed on a downstream (16) side of a waterway (9) with respect to the supporting portion (7) in such a manner as to incline a rotational axis (C).

5 Claims, 5 Drawing Sheets

SPHERICAL BEARING FOR LOCK GATE DOOR AND LOCK GATE DOOR HAVING THE SAME

BACKGROUND OF THE INVENTION

1. Field of the Invention

The present invention relates to a spherical bearing for a lock gate door of a lock gate for opening and closing a waterway in a river, canal, or the like, and a lock gate door having the same.

2. Description of the Related Art

A lock gate door for opening and closing a waterway by rotating about a supporting shaft is proposed in, for example, JP-A-2002-285533 (patent document 1). Such a lock gate door is of a non-powered type, and is adapted to exert a moment on a door body in a waterway closing direction due to its own weight, the door body being provided in such a manner as that a shaft is inclined toward the upstream side of the waterway with respect to a vertical axis.

Such a non-powered type lock gate door is adapted to regulate the degree of opening and closing in correspondence with the relative magnitude of water pressure to which the door body is subjected, it is desirable to open and close the door body smoothly and accurately. In addition, since a large load is applied to the supporting shaft of the door body which is subjected to the water pressure, it is difficult to maintain the smooth and accurate opening and closing operation of the door body for a long period of time. It should be noted that the maintenance of the smooth and accurate opening and closing operation of the door body for a long period of time is particularly desirable for the above-described non-powered type lock gate door, but is also desirable for a powered type lock gate door having a power source for opening and closing the door body.

SUMMARY OF THE INVENTION

The present invention has been devised in view of the above-described aspects, and its object is to provide a spherical bearing for a lock gate door which is capable of maintaining the smooth and accurate opening and closing operation of the door body for a long period of time, and a lock gate door having the same.

In accordance with one aspect of the invention, there is provided a spherical bearing for a lock gate door, comprising: a convex curved body having one of a spherical surface and a toroidal curved surface; and a concave curved seat having another one of the spherical surface and the toroidal curved surface which slidably contacts the one of the spherical surface and the toroidal curved surface of the convex curved body, the toroidal curved surface having a center of curvature located on a circle which has as its center a position spaced apart a predetermined distance from a spherical center of the spherical surface in an axial direction passing through the spherical center of the spherical surface, and which is located in a plane perpendicular to the axial direction, the one of the spherical surface and the toroidal curved surface of the convex curved body having a radius of curvature smaller than a radius of curvature of the other one of the spherical surface and the toroidal curved surface of the concave curved seat.

In one embodiment of the spherical bearing for the lock gate door in accordance with the above-described aspect of the present invention in which the convex curved body has the toroidal curved surface, the toroidal curved surface of the convex curved body has the radius of curvature smaller than the radius of curvature of the spherical surface of the concave curved seat, while, in another embodiment in which the concave curved seat has the toroidal curved surface, the toroidal curved surface of the concave curved seat has the radius of curvature greater than the spherical surface of the convex curved body.

According to the spherical bearing for a lock gate door in accordance with the above-described aspect of the present invention, since the toroidal curved surface has the center of curvature located on the circle which has as its center the position spaced apart the predetermined distance from the spherical center of the spherical surface in the axial direction passing through the spherical center of the spherical surface, and which is located in the plane perpendicular to the axial direction, and the one of the spherical surface and the toroidal curved surface of the convex curved body has the radius of curvature smaller than the radius of curvature of the other one of the spherical surface and the toroidal curved surface of the concave curved seat, the portion where the spherical surface and the toroidal curved surface are brought into sliding contact with each other in an initial period can be limited to a predetermined area excluding a top surface of each of the spherical surface and the toroidal curved surface. At the same time, the relative aligning function of the convex curved body with respect to the concave curved seat can also be exhibited, making it possible to realize the smooth and accurate opening and closing operation of the door bodies of the lock gate door. In addition, even in a case where wear has occurred due to a long period of use, it is possible to allow the wear to occur uniformly over that entire toroidal curved surface starting from the portion where the toroidal curved surface is brought into sliding contact with the spherical surface in the initial period without causing local wear to occur in the concave curved seat, thereby making it possible to maintain the smooth and accurate opening and closing operation of the door bodies for a long period of time.

In a preferred example of the spherical bearing for a lock gate door in accordance with the invention, the toroidal curved surface is formed so as to slidably contact the spherical surface at a portion intersecting lines which pass through the center of curvature of the toroidal curved surface and are inclined at a predetermined range of angle with respect to an axis extending in the axial direction.

In another preferred example of the spherical bearing for a lock gate door in accordance with the present invention, the predetermined range of angle is from 30 degrees to 45 degrees. According to this preferred example, even in a case where wear has occurred due to a long period of use, the wear can be caused more uniformly over the entire toroidal curved surface of the concave curved seat to which the vertical load mainly due to the self weight of the door bodies is applied.

In still another preferred example of the spherical bearing for a lock gate door in accordance with the invention, one of the convex curved body and the concave curved seat has a lubricating oil groove in which lubricating oil, which is supplied between the convex curved body and the concave curved seat, is disposed. According to this preferred example, it is possible to reduce the sliding frictional resistance between the convex curved body and the concave curved seat.

In a further preferred example of the spherical bearing for a lock gate door in accordance with the invention, one of the convex curved body and the concave curved seat has a solid lubricant which smoothly contacts the spherical surface of another one of the convex curved body and the concave curved seat. According to this preferred example, it is possible to reduce the sliding frictional resistance between the convex curved body and the concave curved seat.

In a still further preferred example of the spherical bearing for a lock gate door in accordance with the invention, one of the convex curved body and the concave curved seat has sealing means disposed between the spherical surface and the toroidal curved surface. According to this preferred example, it is possible to prevent the leakage of the lubricating oil between the spherical surface and the toroidal curved surface, and prevent the entry of dust from the outside into the gap between the spherical surface and the toroidal curved surface, thereby making it possible to open and close the door bodies more smoothly and reduce the wear of the toroidal curved surface due to a long period of use.

In the spherical bearing for a lock gate door in accordance with the invention, the convex curved body may have the spherical surface, and the concave curved seat may have the toroidal curved surface, or the convex curved body may have the toroidal curved surface, and the concave curved seat may have the spherical surface.

A lock gate door in accordance with the invention comprises: the above-described spherical bearing for a lock gate door; and a door body which is rotatably supported by a lock gate by means of the spherical bearing for a lock gate door.

In the lock gate door in accordance with the invention, the door body is supported by the lock gate by means of the spherical bearing for a lock gate door so as to be rotatable about a rotational axis which is inclined with respect to a vertical axis.

In accordance with the invention, it is possible to provide a spherical bearing for a lock gate door which is capable of maintaining the smooth and accurate opening and closing operation of the door body for a long period of time, and a lock gate door having the same.

BRIEF DESCRIPTION OF THE DRAWINGS

FIG. 2(*a*) is an explanatory plan view of the embodiment shown in FIG. 1;

FIG. 2(*b*) is an explanatory side view of the embodiment shown in FIG. 1;

DESCRIPTION OF THE PREFERRED EMBODIMENTS

Next, a detailed description will be given of the embodiments of the present invention with reference to the accompanying drawings. It should be noted that the invention is not limited to these embodiments.

In FIGS. 1 to 7, a non-powered type lock gate door 1 in accordance with this embodiment includes a pair of door bodies 2 and 3; a pair of spherical bearings 6 for a lock gate door (hereafter referred to as the spherical bearings) for rotatably supporting lower corner portions 4 of the door bodies 2 and 3, respectively; and a pair of supporting portions 7 for rotatably supporting upper corner portions 5 of the door bodies 2 and 3, respectively.

Figure 1:
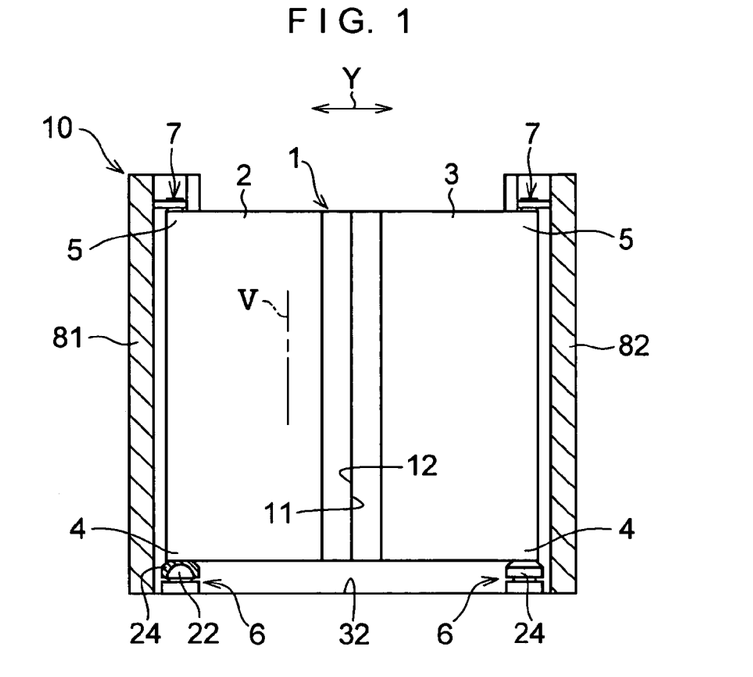
FIG. 1 is an explanatory front elevational view of an embodiment of the invention.
Figure 2:
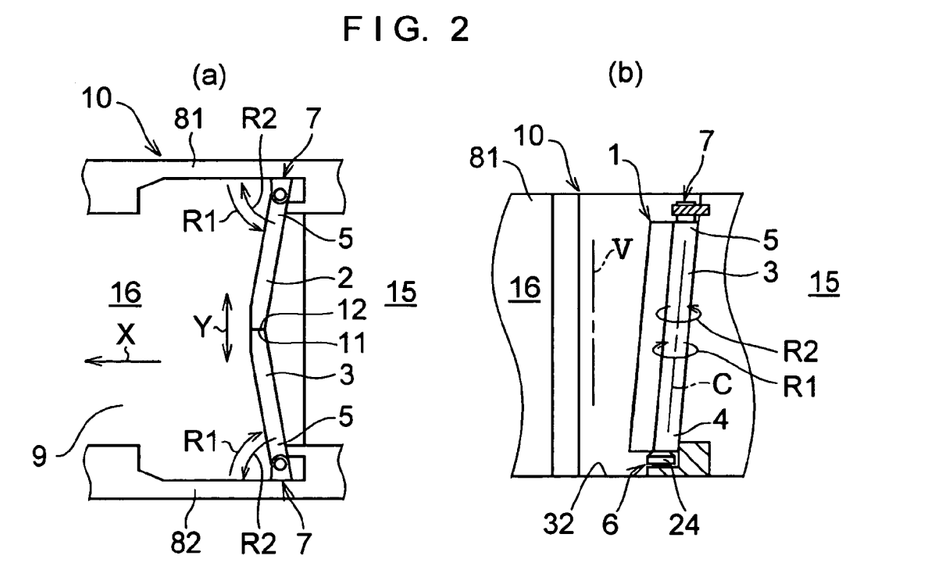

The lock gate door 1 is installed in a lock gate 10 sectioning a waterway 9 such as a canal and a river to effect the regulation and the like of the water level by the opening and closing of the door bodies 2 and 3.

The door bodies 2 and 3 are respectively disposed via the spherical bearing 6 and the supporting portions 7 in the lock gate 10 sectioning the waterway 9 extending in an X direction, so as to be respectively rotatable about rotational axes C extending in an axial direction A which is inclined by, for example, 2 to 3 degrees toward an upstream 15 side of the waterway 9 with respect to a vertical axis V. The door bodies 2 and 3 are disposed in such a manner as to oppose each other in a Y direction perpendicular to the X direction. The door bodies 2 and 3 form a double-leafed hinged door, and edge portions 11 and 12 of the door bodies 2 and 3 located on the central side of the waterway 9 are disposed in such a manner as to abut against each other when the waterway 9 is closed and to be spaced apart from each other when the waterway 9 is opened. The door bodies 2 and 3 are formed in a mutually similar manner. A door closing force acting in a waterway closing direction RI due to the respective self weight is produced in the door bodies 2 and 3 which are rotatable about the rotational axes C.

Figure 3:
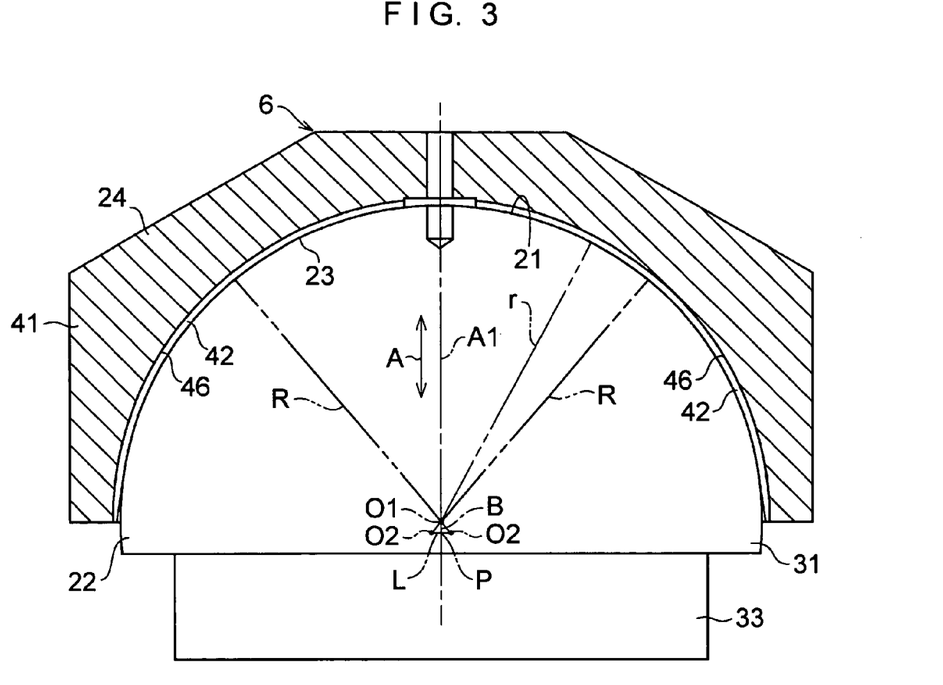
FIG. 3 is an explanatory enlarged view, partly in section, of a spherical bearing for a lock gate door shown in FIG. 1.

The spherical bearing 6 includes a convex curved body 22 and a concave curved seat 24 which slidably contacts the convex curved body 22, and is disposed on a downstream 16 side of the waterway 9 with respect to the supporting portion 7 concerning the X direction in such a manner as to incline the rotational axis C.

Figure 6:
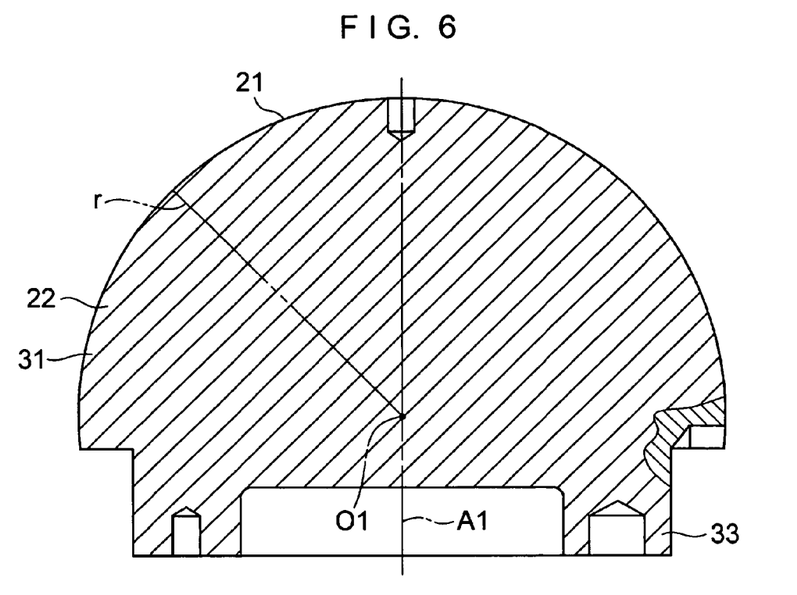
FIG. 6 is an explanatory enlarged cross-sectional view of a convex curved body of the spherical bearing for a lock gate door shown in FIG. 3.
Figure 7:
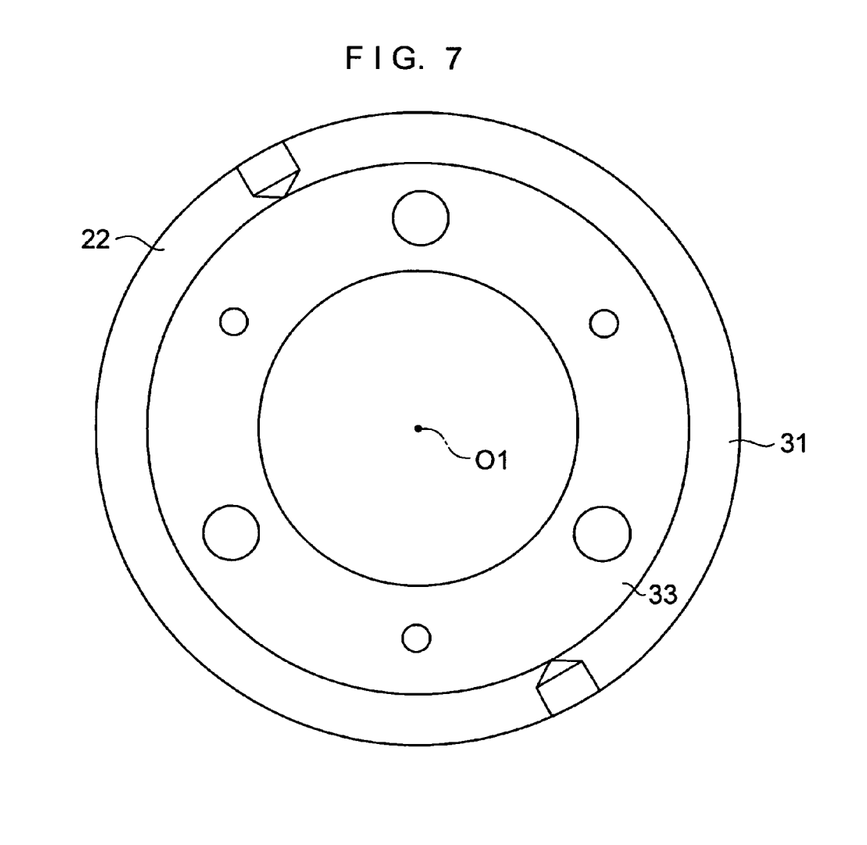
FIG. 7 is an explanatory enlarged view taken from the lower side of the convex curved body shown in FIG. 6.

As shown in FIGS. 3, 6, and 7, for example, the convex curved body 22 made of stainless steel includes a spherical main body 31 having a convex spherical surface 21 on its surface as well as a hollow cylindrical mounting portion 33 which is secured to a lower portion of the spherical main body 31 and is immovably mounted on a bottom portion 32 of the lock gate 10. The spherical surface 21 has a spherical center O1 located on an axis Al extending in the axial direction A. The maximum diameter of the spherical main body 31 may be approximately 60 cm, the outside diameter of the mounting portion 33 may be approximately 50 cm, and the inside diameter of the mounting portion 33 may be approximately 30 cm. The axis A1 agrees with the rotational axis C.

Figure 4:
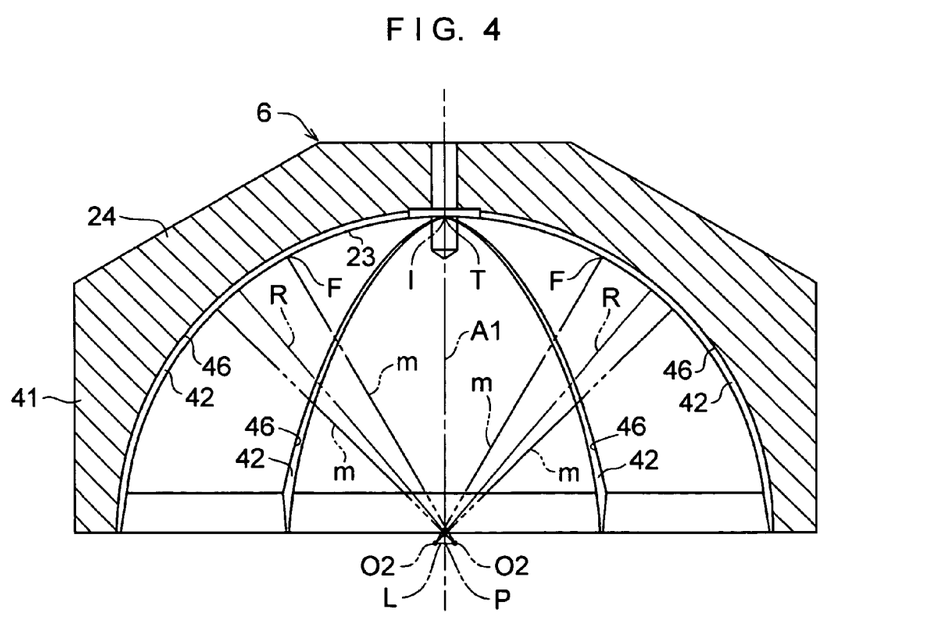
FIG. 4 is an explanatory enlarged cross-sectional view of a concave curved seat of the spherical bearing for a lock gate door shown in FIG. 3.
Figure 5:
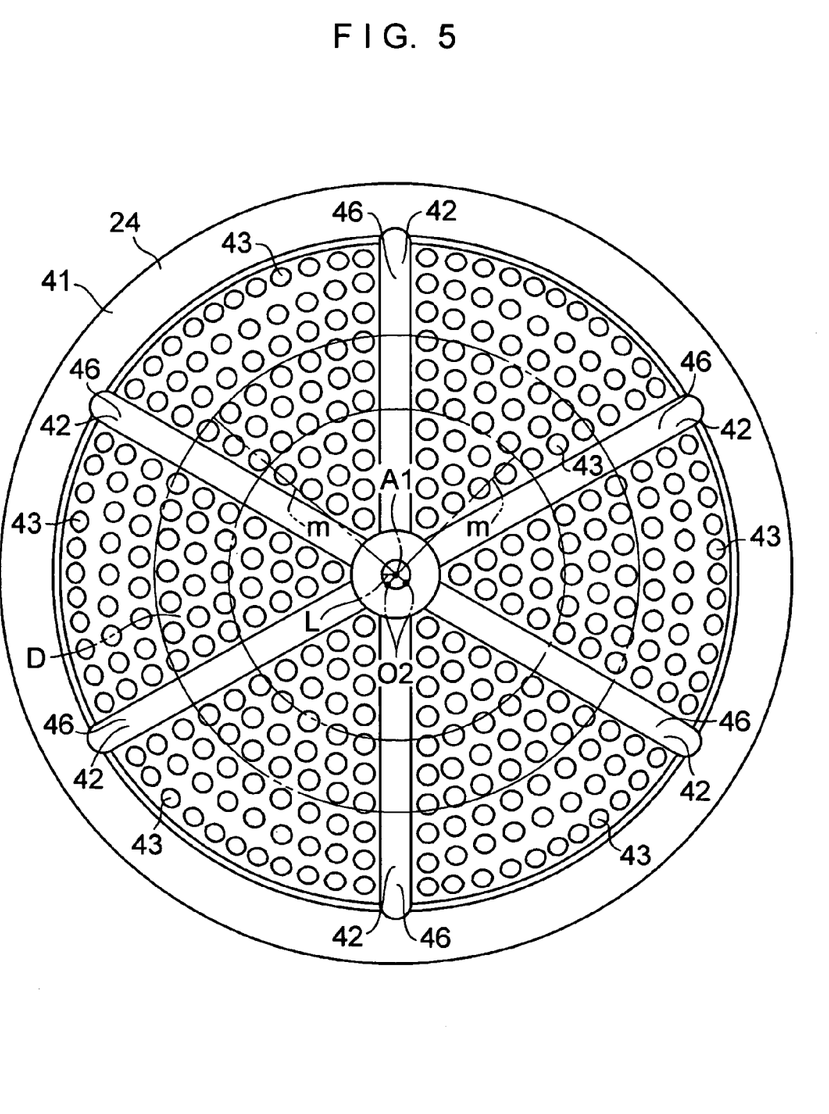
FIG. 5 is an explanatory enlarged view taken from the lower side of the concave curved seat shown in FIG. 4.

As shown in FIGS. 3 to 5, for example, the concave curved seat 24 made of a copper alloy includes a seat main body 41 which is mounted immovably on the lower corner portion 4 of each of the door bodies 2 and 3; a concave toroidal curved surface 23 which is provided on a lower surface of the seat main body 41, has a radius of curvature R greater than a radius of curvature r of the spherical surface 21, and has a center of curvature O2 located on a circle which has a radius L and has as its center a position P spaced apart a predetermined distance B from the spherical center O1 so as to be located away from the spherical surface 21 in the axial direction A passing through the spherical center O1 of the spherical surface 21, the circle being located in a plane perpendicular to the axial direction A; a plurality of lubricating oil grooves 42 which are respectively defined by groove surfaces 46 formed in the toroidal curved surface 23 and in which lubricating oil (grease), which is supplied between the convex curved body 22 and the concave curved seat 24, is disposed; and a plurality of solid lubricants 43 which are respectively fixed to cavity portions formed in the toroidal curved surface 23 and smoothly contact the spherical surface 21 of the convex curved body 22. The outside diameter at the lower surface of the seat main body 41 may be approximately 70 cm, and the inside diameter at the lower surface of the seat main body 41 may be approximately 61 cm. It should be noted that the plurality of solid lubricants 43 shown in FIG. 5 are omitted in FIG. 4.

The toroidal curved surface 23 is formed so as to slidably contact the spherical surface 21 in an initial period at a portion F intersecting lines m which pass through the center of curvature O2 of that toroidal curved surface 23 and are inclined at a predetermined range of angle, i.e., ranging from 30 degrees to 45 degrees in this embodiment, with respect to the axis A1 extending in the axial direction A. The toroidal curved surface 23 may be designed and fabricated so as to slidably contact the spherical surface 21 in an initial period at the portion F intersecting the lines m which pass through the center of curvature O2 and are inclined at an angle, e.g., 30 degrees, 40 degrees, or 45 degrees, with respect to the axis A1. If the toroidal curved surface 23 is thus designed and fabricated, the wear of the toroidal curved surface 23 due to a long period of use can be caused gradually and uniformly in upward and downward directions starting from the portion F of that toroidal curved surface 23, so that it is preferable. It should be noted that the curvature of the toroidal curved surface 23 is the largest at a portion T where a point of intersection I, which is shown in FIG. 4 and intersects the axis A1, is present.

The plurality of lubricating oil grooves 42 extend radially along the toroidal curved surface 23 from the portion T of the toroidal curved surface 23 intersecting the axis A1 toward the lower surface of the seat main body 41. Mutually adjacent ones of the lubricating oil grooves 42 in this embodiment are respectively disposed at angular intervals of 60 degrees in the plane shown in FIG. 5. In this embodiment, six lubricating oil grooves are formed as such a plurality of lubricating oil grooves 42. Both edges of the groove surface 46 are provided with chamfering (including curved surface chamfering). As a result, the lubricating oil disposed in the lubricating oil grooves 42 can be smoothly supplied between the toroidal curved surface 23 and the spherical surface 21 on the basis of the relative sliding movement of the convex curved body 22 and the concave curved seat 24.

As shown in FIG. 5, for example, the plurality of solid lubricants 43 are disposed in plural numbers at least at the portion F of the toroidal curved surface 23 intersecting the lines m and between adjacent ones of the plurality of lubricating oil grooves 42, and are adapted to reduce the sliding frictional resistance between the spherical surface 21 and the toroidal curved surface 23 by smoothly contacting the spherical surface 21. The solid lubricants 43 may also be disposed at portions of the toroidal curved surface 23 other than the portion F. In this embodiment, the solid lubricants 43 are disposed over the entire toroidal curved surface 23 by being arranged between adjacent ones of the plurality of lubricating oil grooves 42.

The supporting portion 7 is disposed on the upstream 15 side of the waterway 9 with respect to the spherical bearing 6 concerning the X direction in such a manner as to incline the rotational axis C. The supporting portion 7 may have a spherical bearing formed in the same way as the spherical bearing 6, or may have a rotational supporting shaft.

In the above-described lock gate door 1, if the door bodies 2 and 3 are subjected to water pressure directed from the upstream 15 side toward the downstream 16 side of the waterway 9, a door opening force, which acts in a waterway opening direction R2 and resists the door closing force in the waterway closing direction R1 based on the self weight of the door bodies 2 and 3, is imparted to the door bodies 2 and 3. If this door opening force exceeds the door closing force, the door bodies 2 and 3 are respectively rotated in the waterway opening direction R2, to thereby open the waterway 9. On the other hand, in such an open state of the waterway 9, if the door opening force based on the water pressure received by the door bodies 2 and 3 is lower than the door closing force, the door bodies 2 and 3 are respectively rotated in the waterway closing direction R1, to thereby close the waterway 9. In the rotation of the door bodies 2 and 3 in the waterway closing direction R1 and the waterway opening direction R2, the toroidal curved surface 23 of the concave curved seat 24 relatively slides with respect to the spherical surface 21 of the convex curved body 22. Thus, the lock gate door 1 is adapted to regulate the water level on the upstream 15 side and the water level on the downstream 16 side.

According to the lock gate door 1 in accordance with this embodiment, the spherical bearing 6 has the convex curved body 22 with the spherical surface 21 and the concave curved seat 24 with the toroidal curved surface 23 which slidably contacts the spherical surface 21 of the convex curved body 22. The toroidal curved surface 23 has the center of curvature O2 located on a circle which has as its center the position P spaced apart the predetermined distance B from the spherical center O1 in the axial direction A passing through the spherical center O1 of the spherical surface 21, and which is located in a plane perpendicular to the axial direction A, and the spherical surface 21 of the convex curved body 22 has the radius of curvature r smaller than the radius of curvature R of the toroidal curved surface 23 of the concave curved seat 24. Therefore, as shown in FIG. 5, for example, the portion F where the spherical surface 21 and the toroidal curved surface 23 are brought into sliding contact with each other in the initial period can be limited to a predetermined area D excluding a top surface (portion T) of each of the spherical surface 21 and the toroidal curved surface 23. At the same time, the relative aligning function of the convex curved body 22 with respect to the concave curved seat 24 can also be exhibited, making it possible to realize the smooth and accurate opening and closing operation of the door bodies 2 and 3 of the lock gate door 1. In addition, even in a case where wear has occurred due to a long period of use, it is possible to allow the wear to occur uniformly over that entire toroidal curved surface 23 starting from the portion F where the toroidal curved surface 23 is brought into sliding contact with the spherical surface 21 in the initial period without causing local wear to occur in the concave curved seat 24. Thus, it is possible to maintain the smooth and accurate opening and closing operation of the door bodies 2 and 3 for a long period of time.

According to the lock gate door 1, the toroidal curved surface 23 of the spherical bearing 6 is formed so as to slidably contact the spherical surface 21 at the portion F intersecting the lines m which pass through the center of curvature O2 of that toroidal curved surface 23 and are inclined at a predetermined range of angle with respect to the axis A1 extending in the axial direction A. Since the predetermined range of angle is from 30 degrees to 45 degrees, even in the case where wear has occurred due to a long period of use, the wear can be caused more uniformly over the entire toroidal curved surface 23 of the concave curved seat 24 to which the vertical load mainly due to the self weight of the door bodies 2 and 3 is applied.

According to the lock gate door 1, since the concave curved seat 24 has the lubricating oil grooves 42 where the lubricating oil, which is supplied between the convex curved body 22 and the concave curved seat 24, is disposed, it is possible to reduce the sliding frictional resistance between the convex curved body 22 and the concave curved seat 24.

According to the lock gate door 1, since the concave curved seat 24 has the solid lubricants 43 which smoothly contact the convex curved body 22, it is possible to reduce the sliding frictional resistance between the convex curved body 22 and the concave curved seat 24.

It should be noted that the spherical bearing 6 may include, instead of the convex curved body 22 and the concave curved seat 24, a convex curved body having a convex toroidal curved surface; and a concave curved seat having the concave spherical surface which slidably contacts the toroidal curved surface of the convex curved body, wherein the toroidal curved surface may have a center of curvature located on a circle which has as its center a position spaced apart a predetermined distance from a spherical center of the spherical surface in an axial direction passing through the spherical center of the spherical surface, and which is located in a plane perpendicular to the axial direction, and the toroidal curved surface of said convex curved body may have a radius of curvature smaller than a radius of curvature of the spherical surface of the concave curved seat. In addition, in a case where the concave curved seat 24 does not have the lubricating oil grooves 42 and the solid lubricants 43, the convex curved body 22 may have the lubricating oil grooves 42 where the lubricating oil, which is supplied between the convex curved body 22 and the concave curved seat 24, is disposed, as well as the solid lubricants 43 which smoothly contact the concave curved seat 24. Such a spherical bearing 6 also exhibits effects substantially similar to those described above.

Figure 8:
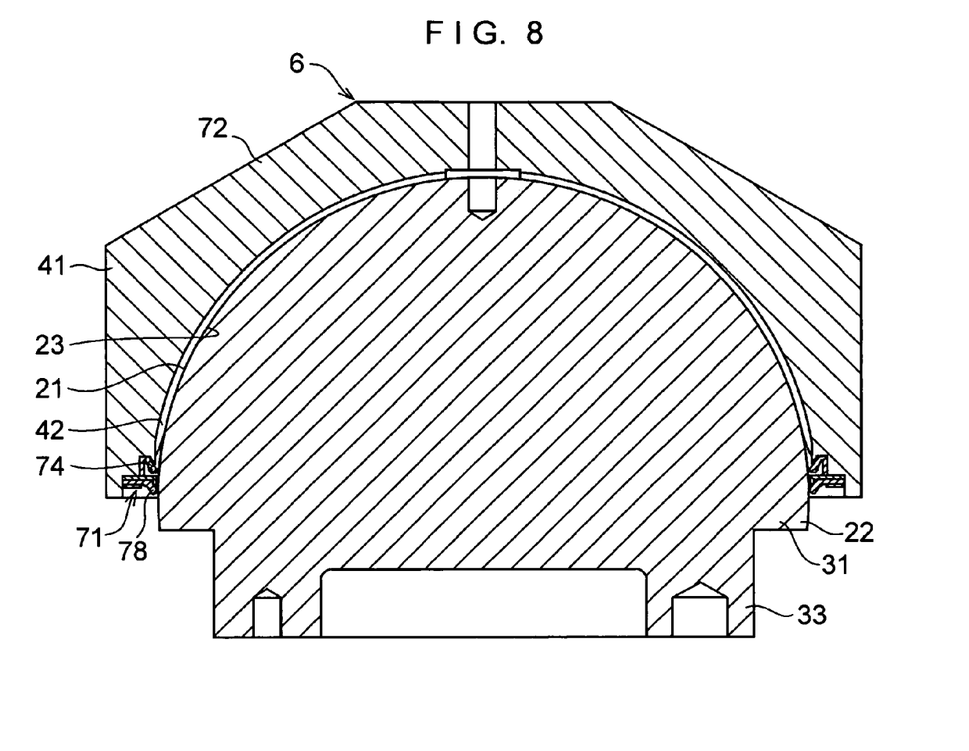
FIG. 8 is an explanatory enlarged view, partly in section, of another embodiment of the spherical bearing for a lock gate door shown in FIG. 1.
Figure 9:
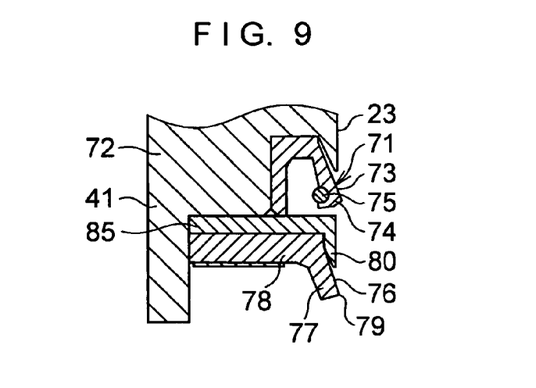
FIG. 9 is an explanatory enlarged cross-sectional view of mainly a sealing means of the spherical bearing for a lock gate door of the other embodiment shown in FIG. 8.

As shown in FIGS. 8 and 9, for example, the spherical bearing 6 may include, instead of the concave curved seat 24, a concave curved seat 72 having a sealing means 71 disposed between the spherical surface 21 and the toroidal curved surface 23.

The sealing means 71 includes an annular seal member 74 which is fitted and secured to the seat main body 41 at a lower portion of the toroidal curved surface 23 and smoothly contacts the spherical surface 21 on its inner periphery 73 side; an elastic ring 75 which is fitted around the outer periphery of the seal member 74 and resiliently urges the seal member 74 toward the spherical surface 21; an annular seal member 78 which is fitted and secured to the seat main body 41 by being disposed below the seal member 74 and has on its inner periphery 76 side an annular projection 77 which smoothly contacts the spherical surface 21; and an annular member 85 which is interposed between the seal member 74 and the seal member 78 and has a projection 80 projecting downwardly so as to downwardly orient a distal end 79 of the annular projection 77 of the seal member 78. The sealing means 71 is adapted to shield the gap between the spherical surface 21 and the toroidal curved surface 23 from the outside primarily by the seal members 74 and 78. The sealing means 71 is provided with a double seal structure using the seal members 74 and 78. According to such a sealing means 71, it is possible to prevent the leakage of the lubricating oil between the spherical surface 21 and the toroidal curved surface 23, and prevent the entry of dust from the outside into the gap between the spherical surface 21 and the toroidal curved surface 23, thereby making it possible to open and close the door bodies 2 and 3 more smoothly and reduce the wear of the toroidal curved surface 23 due to a long period of use. Furthermore, the lock gate door 1 may include, instead of the convex curved body 22, a convex curved body (not shown) having a sealing means disposed between the spherical surface 21 and the toroidal curved surface 23. According to such a sealing means as well, it is possible to prevent the leakage of the lubricating oil between the spherical surface 21 and the toroidal curved surface 23 and the entry of dust from the outside into the gap between the spherical surface 21 and the toroidal curved surface 23, thereby making it possible to open and close the door bodies 2 and 3 more smoothly and reduce the wear of the toroidal curved surface 23 due to a long period of use.

Furthermore, the lock gate door 1 may include a pair of dampers (not shown) whose one ends are respectively attached to the door bodies 2 and 3 and whose other ends are respectively attached to side walls 81 and 82 of the lock gate 10. The lock gate door 1 may further include a pair of counterweights (not shown) which are each installed by means of a rope or the like so as to impart a door opening force resisting the door closing force to the door bodies 2 and 3. In the case where the dampers are provided, it is possible to produce a resisting force which increases or decreases in correspondence with the rotational speed of the door bodies 2 and 3, thereby making it possible to prevent an unexpected fast rotation of the door bodies 2 and 3. In the case where the counterweights are provided, it is possible to prevent an unexpected fast rotation of the door bodies 2 and 3 in the waterway closing direction RI.

In addition, although the lock gate door 1 in the above-described embodiments is of the non-powered type, the lock gate door may be of a powered type in which a pair of door bodies are respectively opened and closed by the operation of power units such as hydraulic cylinders. For example, the above-described lock gate door of powered type installed in the Panama Canal or the like where vessels pass through may be arranged to open the waterway 9 by rotating the pair of door bodies toward the upstream 15 side by the operation of the power units in a case where the water levels of the upstream 15 and the downstream 16 are equaled to each other, and close the waterway 9 in the other cases.

What is claimed is:

1. A spherical bearing for a lock gate door, interposed between a door body and a lock gate such that the door body which has a rotational axis inclined with respect to a vertical axis is rotatably supported around the rotational axis by the lock gate, said spherical bearing comprising:

a convex curved body made of stainless steel and having a spherical surface, and a concave curved seat made of copper alloy and disposed above the convex curved body, said concave curved seat having toroidal curved surface which slidably contacts said spherical surface of said convex curved body, said toroidal curved surface having a center of curvature located on a circle which has as its center a position spaced apart a predetermined distance from a spherical center of the spherical surface in an axial direction passing through the spherical center of the spherical surface, and which is located in a plane perpendicular to the axial direction, said spherical surface of said convex curved body having a radius of curvature smaller than a radius of curvature of said toroidal curved surface of the concave curved seat, said toroidal curved surface is formed so as to slidably contact said spherical surface at a portion intersecting lines which pass through the center of the curvature of the toroidal curved surface and are inclined at a range of angles ranging from 30 degrees to 45 degrees with respect to an axis extending in the axial direction.

2. The spherical bearing for a lock gate door according to claim 1, wherein one of said convex curved body and said concave curved seat has a lubricating oil groove in which lubricating oil, which is supplied between said convex curved body and said concave curved seat, is disposed.

3. The spherical bearing for a lock gate door according to claim 1, wherein one of said convex curved body and said concave curved seat has a solid lubricant which smoothly contacts another one of said convex curved body and said concave curved seat.

4. The spherical bearing for a lock gate door according to claim 1, wherein one of said convex curved body and said concave curved seat has sealing means disposed between the spherical surface and the toroidal curved surface.

5. A lock gate door comprising:
   the spherical bearing for a lock gate door according to claim 1; and
   a door body which is rotatably supported by a lock gate by means of the spherical bearing for a lock gate door.

* * * * *